United States Patent [19]

Chavand et al.

[11] 4,337,098

[45] Jun. 29, 1982

[54] PROCESS FOR CUTTING OUT A WALL MADE OF METAL OR METAL ALLOY

[75] Inventors: Jean Chavand, Grenoble; Maurice Daguenet, Veurey; Rene Gillet, Grenoble, all of France

[73] Assignee: Commissariat a l'Energie Atomique, Paris, France

[21] Appl. No.: 225,666

[22] Filed: Jan. 16, 1981

[30] Foreign Application Priority Data

Jan. 28, 1980 [FR] France ............................ 80 01771

[51] Int. Cl.$^3$ .............................................. B23K 7/08
[52] U.S. Cl. ................................. 148/9 R; 148/9 C
[58] Field of Search ................. 148/9 R, 9 C, 9.5, 9.6

[56] References Cited

U.S. PATENT DOCUMENTS 2,438,344   3/1948   Meincke ........................... 148/9 R Primary Examiner—W. Stallard
Attorney, Agent, or Firm—Oblon, Fisher, Spivak, McClelland & Maier

[57] ABSTRACT

The present invention relates to a process for cutting out a wall made of metal or metal alloy, by fissuring, comprising the steps of heating one face of the wall to melt the metal locally over a depth limited to a fraction of the thickness of the wall; adding in the molten zone a metal having a fissuring power; moving the heating means along the section to be cut out, while continuing to add the metal having a fissuring power in the molten zone. The invention is applicable to cutting out walls made of metal or metal alloys.

7 Claims, 1 Drawing Figure

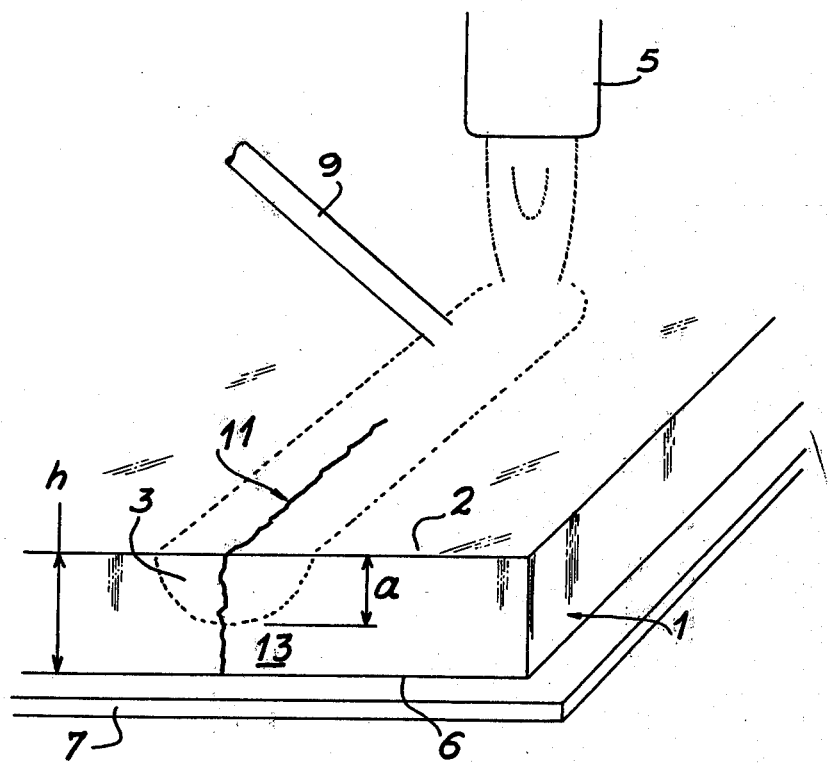

PROCESS FOR CUTTING OUT A WALL MADE OF METAL OR METAL ALLOY

The present invention relates to a process for cutting out a wall made of metal or metal alloy, by fissuring.

This process makes it possible to cut out metal sheets or pieces, particularly made of steel, by hand or using an automatic apparatus, with access to only one of the faces of the piece to be cut out.

A considerable number of cutting processes are presently known, which may be classified in two categories, namely mechanical processes, on the one hand, and processes whereby the metal of the sheet is locally melted, on the other hand. Mechanical processes include shearing, milling, sawing and grinding with a cutting wheel. Processes by melting include oxyacetylene processes, processes employing an arc with coated electrode, plasma, laser and electronic bombardment.

Certain conditions must be fulfilled for these known processes to be used. Firstly, the whole thickness of the sheet must be traversed, whether it be by the tool, in the case of the mechanical cutting out processes, or by the hot source, in the case of processes for cutting out by fusion. It is therefore necessary to provide a sufficient space behind the piece. It may be added that mechanical cutting out processes can be applied only to pieces or sheets having a relatively regular geometry oand suitable inherent flatness.

Now, it is sometimes necessary to cut out pieces of any shape without encroaching upon the rear side thereof. It is precisely an object of the invention to provide a process for cutting out a metal wall, particularly of steel, from only one of its faces, without necessitating a space available behind the piece.

This process employs the fissuring power of a metal, such a copper, on another metal, for example steel, or on a metal alloy. It has, in fact, been observed that the addition of copper in a molten metal provokes the fissuration of this metal. This remarkable property will hereinafter be called the fissuring power of the copper.

More precisely, this process of cutting out a wall made of metal or a metal alloy by fissuring, is characterised in that:
  one face of the wall is heated to melt the metal locally over a depth limited to a fraction of the thickness of the wall,
  a metal having a fissuring power is added in the molten zone,
  the heating means are moved along the section to be cut out, whilst the metal having a fissuring power is continuously added in the molten zone.

The metal having the power to fissure the steel can be carbon, aluminium, silicon or copper. One can also use alloys of these metals with elements of group 4 or of group 11B.

Thus, the use of these fissuring metals makes it possible to cut out steels, stainless, austenitic or ferritic steels, heat resistant steel or inconels . . .

The using of some various sources of heat, such as ARC, TIG, MIG, HF and FE, enables the cutting out of plates of 25 mm in thickness. When combining the heating means, this makes it possible to cut out very important thicknesses. This may also be carried with the use of stuffed wires, that is to say a cylinder made of a strip steel full of a powder of some metals having a fissuring power (carbon, silicon, aluminium or copper) and of some elements of group 4 and of group 11B.

It is obvious that the cutting out process according to the invention is applicable to any piece made of steel, and particularly to sheet steel.

Thus, the process according to the invention makes it possible to heat only one face of the wall or of the piece to be cut out, since the source of heat and the molten zone are limited to the front of the plate. Thin foils or other heat-sensitive pieces may be placed in the vicinity of or even in contact with the wall to be cut out. For example, the process according to the invention enables containers containing thin tubes in contact with the sheet of the container to be opened, without deteriorating the thin tubes.

Cutting out with the aid of the process according to the invention may be effected without employing cooling liquid. This makes it possible to cut out plates or pieces taken to a high temperature, for example because they emerge from an oven, without having to cool them previously.

The process may be carried out by hand. It may also be carried out with the aid of an automatic apparatus. In this case, the lines of fissuration are much more regular and are even perfectly rectilinear.

The invention will be more readily understood on reading the following description with reference to the accompanying drawings, in which:

The single FIGURE schematically illustrates the process for cutting out by fissuration.

EXAMPLE 1

Referring now to the drawing, reference 1 designates the piece to be cut out. This piece 1 is a plate of stainless steel measuring 400 mm in length and 4 mm in thickness. Only the face 2 of the piece 1 is heated in the course of cutting out according to the process of the invention. The piece 1 is heated locally in the zone 3 by means of a welding torch 5 or by any other suitable heating apparatus, to melt the piece over a sufficient thickness. It will be noted that the depth a of the molten zone 3 is limited to a fraction of the thickness h of the piece 1. Thus, the face 6 of the piece 1 is not affected by the heat of the torch 5. This is why the process according to the invention enables a piece such as 1 to be cut out without deteriorating another heat-sensitive piece located in the vicinity thereof or even in contact therewith. Such a thin sheet 7 is directly in contact with the face 6 of the piece to be cut out, as is the case for example in a container containing a thin tube.

According to the invention, a metal having the power to fissure the steel is added in the molten zone 3. This metal 9 may be constituted by copper, for instance or an alloy of copper and silicon with 1.5% by weight of silicon. In the embodiment envisaged, the necessary quantity of copper is one meter of wire with a diameter of 1.6 mm.

The essential point is to start the fissure 11, which requires a certain experience. The fissure then progresses as the torch 5, which is displaced along the section to be cut out, advances, whilst metal 9 is continuously added in the molten zone 3.

Although the thickness a of the molten zone 3 is limited to only a fraction of the thickness h of the piece 1, the crack 11 propagates in the solid metal 13 until it reaches face 6.

EXAMPLE 2

In this second example, the cutting out by fissuration is performed on a stainless steel sheet of 20 mm in thickness. The metal having the power to fissure the steel is brought in under the form of a carbon bar 9. The thickness a of the molten zone 3 is limited to 30% of the plate thickness. The source of heat is a TIG (tungstene inert gas) torch; the moving speed of the torch is 100 mm per minute.

EXAMPLE 3

In this third example, the cutting out is performed on a steel plate of 25 mm in thickness; the metal having the power to fissure the steel here being a A1-S1 alloy bar 9 (13% Si); the thickness of molten zone a being limited to 25% of the plate thickness approximately; the heating means being a MIG. (Midjet inert gas) torch and its moving speed 60 mm per minute.

EXAMPLE 4

In the fourth example, the cutting out is performed on a stainless steel sheet of 40 mm in thickness. The metal having the power to fissure is a Cu-Sn bar 9 (10% Sn). The sources of heat are a high frequency heating combined with a TIG torch. The thickness a of the molten zone is around 50% of the sheet thickness and the moving speed of the heating means is 45 mm in a minute.

What is claimed is:

1. A process for cutting out a wall made of metal or metal alloy by fissuring, comprising the steps of:
   heating one face of the wall to melt the metal locally over a depth limited to a fraction of the thickness of the wall,
   adding in the molten zone a material having a fissuring power,
   moving the heating means along the section to be cut out, whilst continuing to add the metal having a fissuring power in the molten zone.

2. The process of claim 1, wherein the metal wall is made of steel.

3. The process of claim 1, wherein the heating means are moved and the material is added, by hand.

4. The process of claim 1, wherein the heating means are carried, and the addition of material is effected, by an apparatus which moves automatically along the section to be cut out.

5. The process of claim 1, wherein the material having a fissuring power is chosen from the group constituted by copper and by a Cu-Si alloy with 1.5% by weight of silicon.

6. The process of claim 1, wherein the material having a fissuring power is chosen from the group constituted by carbon, aluminium, copper, silicon and their alloys with elements of group 4 of of group 11B.

7. The process of claim 1, wherein the bringing in of material is constituted by a rolled strip steel stuffed with at least one material having a fissuring power, and then sealed up.

* * * * *